C. Fairfax, Jr,
Belt Fastener,

N° 29,684.   Patented Aug. 21, 1860.

Witnesses;
J.W. Coombs.
R.S. Spurr

Inventor;
Chas Fairfax Jr
per Munn & Co
Attorneys

UNITED STATES PATENT OFFICE.

CHARLES FAIRFAX, JR., OF CINCINNATI, OHIO.

COUPLING FOR BELTS.

Specification of Letters Patent No. 29,684, dated August 21, 1860.

*To all whom it may concern:*

Be it known that I, CHARLES FAIRFAX, Jr., of Cincinnati, in the county of Hamilton and State of Ohio, have invented a new and Improved Coupling for Belts; and I do hereby declare that the following is a full, clear, and exact description thereof, reference being had to the accompanying drawings, making part of this specification, in which—

Figure 1:
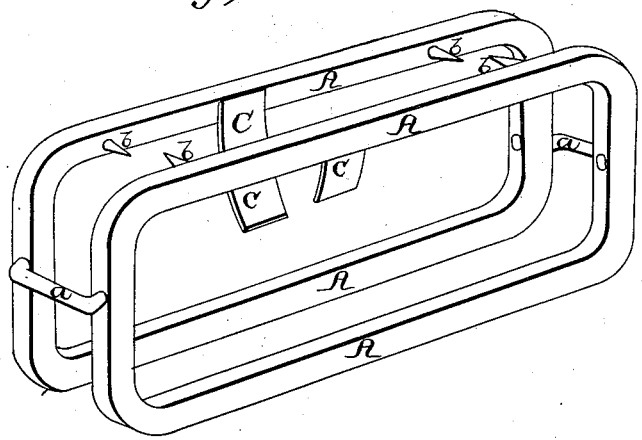
Figure 1:
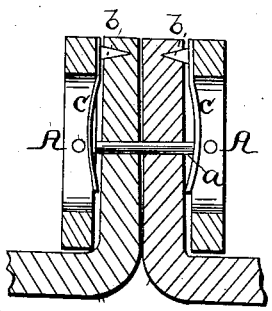

Figure 1 is a perspective view of the improved belt coupling. Fig. 2 is a transverse section through the coupling holding two ends of a belt.

Similar letters of reference indicate corresponding parts in both figures.

This invention is an improved device for coupling together flat pulley belts.

The object of the improvement is to make self coupling that may be applied to the belt or detached from it in a very short time.

It consists in the use of two rectangular frames suitably connected together at each end by jointed rods, and furnished with spikes and springs for preventing the ends of the belts from slipping from between the jaws of the frames when the belt is put under tension; all as will be hereinafter described and represented.

To enable those skilled in the art to fully understand my invention I will proceed to describe its construction and operation.

A, A, are two rectangular frames of metal which are equal or nearly so in length to the ends of the belt to be connected by them and of any suitable width. These frames are connected together by two strong rods $a$, $a$, of equal length, that are pivoted to their ends at about the middle of their width. The longitudinal bars of the frames are thus kept parallel to each other. $b$, $b$ are pins projecting from the top cross bars of the frame, and $c$, $c$, are curved springs projecting down from these upper cross-bars, and curved inward.

The ends of a belt to be coupled are passed up between the frames A, A, as represented in red lines Fig. 2, and the upper part of the frames A, A, are closed driving the pins $a$, $a$, into the ends of the belt. The belt is then stretched over its pulleys, and it will be seen that when the belt is thus put under tension the frames will operate like two levers, the belts drawing the lower bars apart will force the upper bars or jaws together, and confine the ends securely between them, thus the greater the strain put upon the belt, the tighter will the coupling jaws be held together.

These couplings may be detached from the belt by loosening the belt or drawing the ends together, and they may be applied in a few minutes to belts of any thickness.

Having thus described my invention, what I claim as new, and desire to secure by Letters Patent, is—

The belt coupling herein described consisting of two frames A, A, jointed together by rods $a$, $a$, and furnished with pins $b$, $b$, substantially as herein described.

CHARLES FAIRFAX, JR.

Witnesses:
 EVAN CHUAN,
 EUGENE TAYLOR.